United States Patent [19]

Lee

[11] Patent Number: 5,379,163
[45] Date of Patent: Jan. 3, 1995

[54] CONTINUOUS REPRODUCTION METHOD OF TAPES FOR A DOUBLE-DECK VTR

[75] Inventor: Hyong-Ju Lee, Seoul, Rep. of Korea

[73] Assignee: SamSung Electronics Co., Ltd., Suwon, Rep. of Korea

[21] Appl. No.: 907,794

[22] Filed: Jul. 2, 1992

[30] Foreign Application Priority Data

Jul. 9, 1991 [KR] Rep. of Korea ............... 91-11620

[51] Int. Cl.[6] ............... G11B 15/18; G11B 15/48
[52] U.S. Cl. ............... 360/69; 360/72.2; 360/74.4
[58] Field of Search ............... 360/69, 9.1, 14.1, 14.2, 360/33.1, 15, 71, 74.4, 74.5, 72.1, 72.2, 61; 354/335

[56] References Cited

U.S. PATENT DOCUMENTS

| | | | |
|---|---|---|---|
| 4,309,729 | 1/1982 | Kice | 360/72.1 |
| 4,969,135 | 11/1990 | Toke | 360/13 X |
| 5,008,762 | 4/1991 | Sung | 360/69 |
| 5,124,807 | 6/1992 | Dunlap et al. | 360/14.1 |

Primary Examiner—Aristotelis Psitos
Assistant Examiner—Varsha A. Kapadia
Attorney, Agent, or Firm—Robert E. Bushnell

[57] ABSTRACT

The present invention relates to a double-deck VTR which can reproduce continuously, without any interruption, contents of the same program tele-recorded on a multitude of tapes. The present invention further relates to a continuous reproduction method of tapes for a double-deck VTR wherein naturally-matched video images can be viewed, during the reproduction by the double-deck VTR, according to detection of auto marking, end marking and start marking signals. The reproduction of tape tele-recorded with the next contents is readily performed simultaneously with the ending of the tape being reproduced in accordance with auto marking, end marking and start marking signals marked on a multitude of tapes separately tele-recorded with the same program.

17 Claims, 2 Drawing Sheets

CONTINUOUS REPRODUCTION METHOD OF TAPES FOR A DOUBLE-DECK VTR

BACKGROUND OF THE INVENTION

FIELD OF THE INVENTION

The present invention relates to a double-deck VTR (Video Tape Recorder), and more particularly to a continuous reproduction method of tapes for a double-deck VTR which can reproduce the contents of programs continuously without being interrupted when the same program is tele-recorded on a plurality of tapes.

DESCRIPTION OF THE PRIOR ART

Generally, most of the programs currently on the market are so voluminous that one program is tele-recorded on at least two or more tapes, when a single tape is not capable of recording the entire program.

Accordingly, in order for a user to reproduce one program tele-recorded on one or more tapes by using the double-deck VTR, one tape tele-recorded with a first program is inserted into one side of the deck (hereinafter referred to as "the first deck") and the other tape tele-recorded with a second program is inserted into the other side of the deck (hereinafter referred to as "the second deck").

After the first program in the first deck is appreciated by reproduction, the second program in the second deck is appreciated by reproduction. Likewise, other programs tele-recorded on a plurality of tapes are in turn reproduced and appreciated.

Furthermore, after one tape is reproduced by using only one deck, thereafter the next tape is inserted and reproduced, which has been the appreciation method when one program is tele-recorded on a plurality of tapes.

However, this kind of conventional method has the disadvantages of causing the heightened mood of the viewer(s) to drop due to the interruption of the programs resulting from the changes of tape.

Besides, when the program is tele-recorded the user has the tendency of overlapping the ending portion of the first program of the first tape with the starting portion of the next program of the second tape, causing the viewer to appreciate the overlapped pictures and to consume time unnecessarily. Particularly when a single deck is used, the disadvantage of changing tapes arises.

SUMMARY OF THE INVENTION

Accordingly, it is the object of the present invention to provide a continuous reproducing method of tapes for a double-deck VTR, which can make the pictures tele-recorded on two or more tapes inserted in the double decks match smoothly and be reproduced continuously by a predetermined sign being marked on the identical program tele-recorded on at least two or more tapes and in accordance with predetermined marking during the tape reproducing.

The continuous reproducing method of tapes for a double-deck VTR in accordance with the present invention can continuously reproduce a plurality of tapes tele-recorded with an identical program, comprising:

a first process for performing a reproducing operation of A deck after perceiving the deck into which a reproducing key is input as A deck and perceiving the other deck as B deck;

a second process for maintaining the waiting status of reproducing by searching for the start marking position from B deck when an automarking signal is detected from A deck while performing the reproducing operation; and a third process wherein when an end marking signal is detected from A deck, reproducing of a tape within A deck is stopped and at the same time, B deck is perceived as A deck, and then A deck into which the tape tele-recorded with the next contents is re-loaded is perceived as B deck and the reproducing operation of A deck is performed.

Other aspects and advantages of the present invention will become apparent from the following description of the preferred embodiments, taken in connection with the accompanying drawings, which disclose, by way of example, the principles of the invention.

DETAILED DESCRIPTION OF THE INVENTION

Figure 1:
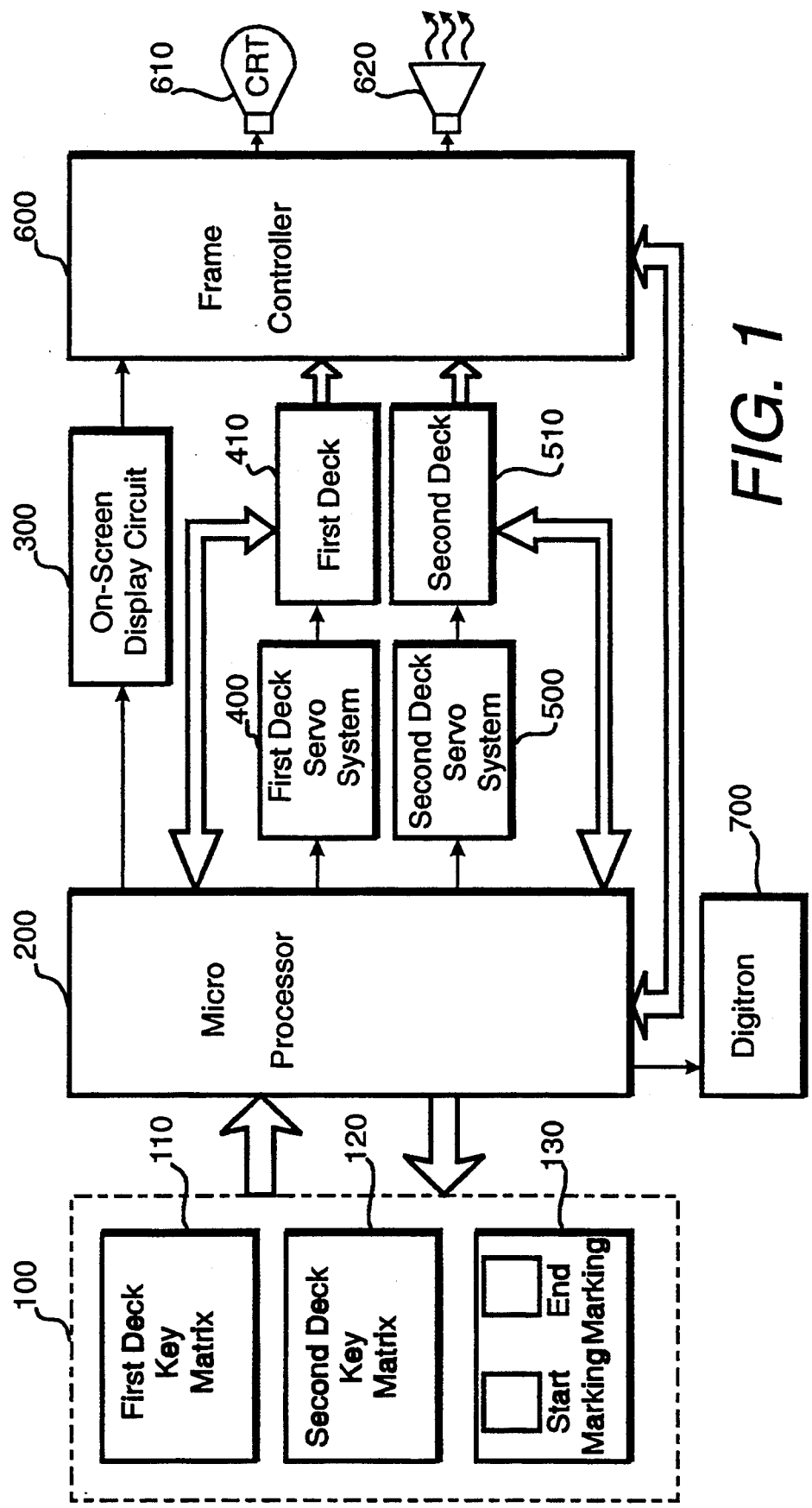
FIG. 1 illustrates a schematic block diagram of a double-deck VTR for performing a continuous reproduction method of tapes in accordance with the present invention.

FIG. 1 is a simplified schematic block diagram of a double-deck VTR for performing a continuous reproduction method of tapes in accordance with the present invention.

In FIG. 1, a key matrix 100, having first and second deck key matrixes, 110 and 120, respectively, a plurality of function keys and marking key 130, is provided for generating key signals to control the double-deck VTR in accordance with the operation of the user.

On first deck key matrix 110, play, fast forward (FF), rewind (REW), stop, pause and tele-recording function keys are conventionally established for performing reproducing and recording operations. On second deck key matrix 120, other keys than what are on first deck matrix 110 are established.

Meanwhile, function keys including a power key, volume control key, channel selection key, program memory key, turn key having 0-9 graduations and marking key 130 comprising a start marking key and an end marking key, are provided.

200 is a micro processor for outputting various corresponding control signals after receiving signals in accordance with various key signals generated from key matrix 100. The key signals are indicative of the status of the double-deck VTR.

300 is an on-screen display circuit for generating various character signals for display on the screen after receiving the control signals output from micro processor 200.

400 & 500 are first & second servo systems for driving first and second decks 410, 510, respectively, after receiving the control signals output from micro processor 200. Signals indicating the status of first & second decks 410, 510 are input to micro processor 200.

600 is a frame controller for causing the image, character and voice to be output through CRT 610 and speaker 620 after receiving the character signals output from on-screen display circuit 300, image signals output from first & second decks 410, 510 and audio signals.

700 is a digitron for showing the loading and operational status of a tape, allowing the user to easily perceive the status of the double-deck VTR.

Accordingly, in order for the user to view the identical program tele-recorded on at least two more tapes continuously without interruption, the user loads the tape (hereinafter referred to as "the first tape") tele-recorded with first contents into first deck 410, and loads the tape (hereinafter called as "the second tape") tele-recorded with next contents into second deck 510.

Henceforth, the user operates first & second deck key matrices 110, 120 of key matrix 100, and searches for the overlapped portion at the end portion of the first tape loaded into first deck 410 and at the first portion of the second tape loaded into second deck 510.

In other words, according to the winding status of the first & second tapes loaded into the first & second decks 410, 510, respectively, the user operates the FF, REW and play buttons of the first & second deck key matrices 110, 210 on key matrix 100.

The key signal generated by said key operation is input to micro processor 200 which, in turn, drives first & second deck servo systems 400, 500 by outputting control signals.

First & second deck servo systems 400, 500 drive first & second decks 410, 510 for FF or rewinding the first & second tapes at the end portion of the first tape and the beginning portion of the second tape.

When reproduction is performed at the end of the first tape, the image and audio signals at the end of the first tape are output as pictorial images and voices to CRT and speaker 620 by frame controller 600.

When the images and voices are output to CRT 610 and speaker 620, the user memorizes the output images, reproduces the first portion of the second tape, and searches the end portion of the first tape for an overlapping or connected portion.

At this moment, it is acceptable that the overlapping or connected portion of the first & second tapes can be searched by a search function.

After the overlapping or connected portion of the first & second tapes is searched, the user operates the end marking key on marking key 130 at key matrix 100.

When the end marking key is operated, micro processor 200 controls first deck servo system 400 after perceiving entry of the end marking key signal.

Here, first deck servo system 400 is controlled by micro processor 200 and records the predetermined end marking signals on the end portion of the first tape loaded into first deck 410.

In this location, the end marking signals, under the condition of not hindering the video signals, carry in VTR-detectable signals during reproduction of video signals.

When end marking the ending portion of the first tape is finished, micro processor 200 controls first deck servo system 400 and rewinds (REW) the first tape loaded into first deck 410 for a predetermined period of time.

When the first tape has rewound for the predetermined period of time, REW is halted and automarking is automatically performed.

At this point, the conventional rewinding speed is 24 times the reproduction speed, and rewinding time is approx. 5 minutes for 120-minute tape.

Therefore, in the case of a 120-minute tape, because the time spent for reaching the start marking point whenever REW is performed, is 5 minutes or less, the auto marking signal is recorded at a place where 5 minutes of reproduction time from the end marking signal is taken.

In other words, after the auto marking signal is perceived, and before the end marking signal on the first tape is perceived, REW of the second tape containing the next contents is performed until the start marking position on the second tape is reached. Then the tapes can be continuously reproduced, since the auto marking signal is positioned at a place which is 5 minutes of reproduction time away from the end of the first tape.

As the reproduction time of 5 minutes equals 12.5 seconds of REW time, in the case of a 120 minute-tape, it is appropriate that the recording of the auto marking signal be made after approximately 13 seconds of rewinding has been performed.

When auto marking is finished, the user removes the first tape from first deck 410 and loads the second tape having been loaded into second deck 510, into first deck 410.

After the second tape is loaded into first deck 410, the user operates the start marking key of marking key 130.

Micro processor 200 perceives the key signals generated from the operation of start marking key and controls first deck servo system 400.

First deck servo system 400 is controlled by micro processor 200, and records the predetermined start marking signal on the first portion of the second tape loaded in first deck 410.

The start marking signal, the auto marking signal and the end marking signal are recorded as separate signals.

Henceforth, when there is another tape tele-recorded with the identical program, the third tape tele-recorded with the next contents after the contents tele-recorded at the end portion of the second tape is loaded into second deck 510, and as mentioned above, the inter-connected portion of contents is searched, and the end marking, auto marking and start marking processes are repeatedly performed.

In this way, when the marking of several pieces of tapes is finished, tele-recording of the auto marking signal and the end marking signal is performed on the ending portion of the first tape (which is the first in order), and on the first portion of the last tape, only the start marking signal is tele-recorded. On the tape existing between the first and last tape, the start marking signal is tele-recorded on the beginning portion, while auto marking and end marking signals are tele-recorded on the end portion of the tape.

At this point, the ending portion of the first tape and the beginning portion of the second tape are matched, the first deck is then selected and end marking and auto marking are performed on the end portion of the first tape. Thereafter, the second deck is selected, and start marking on the beginning portion of the second tape can be performed.

Also, if a third tape is available, the third tape is loaded into the first deck, the search is performed on the ending portion of the second tape loaded into the second deck and on the beginning portion of the third tape loaded into the first deck where the tele-recorded contents are connected, and as mention above, the tele-recording operation of marking signals is repeatedly performed.

If marking is done to the tapes during manufacture, the user will not be allowed to perform the marking works described above.

Henceforth, when the user wants to view the identical program on a plurality of tapes marked with auto marking, end marking and start marking signals, the user loads the first & second tapes into first & second decks 410, 510, respectively operates key matrix 100, and reproduces the tape tele-recorded with the first contents.

Namely, when the tape tele-recorded with the first contents is loaded into first deck 410, the user presses the reproduction button on first deck key matrix 110.

Micro processor 200, after perceiving the signals generated by pressing the reproduction button, controls first deck servo system 400 and reproduces the first tape loaded in first deck 410.

The video signal and audio signal generated by the reproduction of the first tape loaded in first deck 410 are input into frame controller 600, which outputs video images and voices through CRT 610 and speaker 620.

In the process of reproducing the first tape, when the auto marking signal is perceived by the video signals generated from first deck 410, micro processor 200 enables reproduction of the first tape continuously, rewinds the second tape loaded in second deck 510, and perceives the start marking signal.

When the start marking signal is perceived on the second tape, micro processor 200 controls second deck servo system 500, causing the second tape loaded in second deck 510 to standby in a ready-to-reproduce status.

Although second deck 510 is in the ready-to-reproduce status, the first tape loaded in first deck 410 reproduces continuously, and after the prescribed period elapses, the end marking signal is perceived.

Micro processor 200, when the end marking signal from the first tape loaded in first deck 410 is perceived, controls second deck servo system 500, reproduces the second tape loaded in second deck 510, and at the same time, controls first deck servo system 400 and finally stops the reproduction operation of first deck 410.

Accordingly, the contents tele-recorded continuously on the first and second tapes are reproduced without interruption.

If the contents tele-recorded on the second tape are tele-recorded continuously on a third tape, the user extracts the first reproduction-finished tape in first deck 410, and then, loads the third tape into first deck 410.

Then, in the same manner as above, micro processor 200 reproduces the second tape loaded in second deck 510 and perceives the auto marking signal.

When the auto marking signal is perceived from second deck 510, micro processor 200 searches the third tape loaded in first deck 410 and seeks out the start marking signal.

When the start marking signal is found, micro processor 200 puts first deck 410 on the reproduction-waiting status and when the end marking signal is perceived from the second tape, micro processor 200 reproduces the third tape in first deck 410.

As described in the foregoing, when all the end marking, auto marking and start marking are performed on the many pieces of tapes tele-recorded with the identical program, the identical program can be viewed continuously without interruption.

Figure 2:
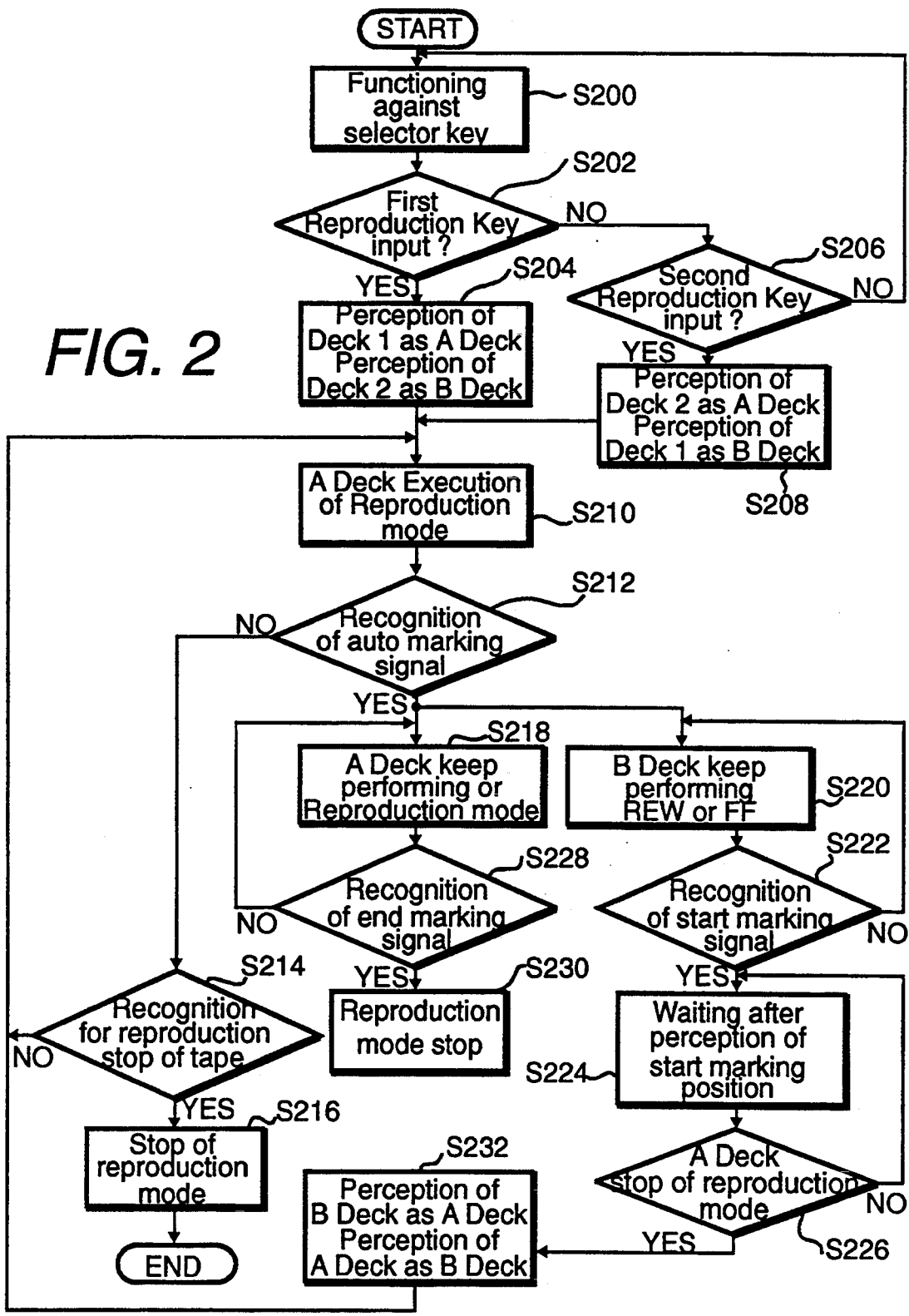
FIG. 2 is a flow chart illustrating an embodiment of the continuous reproducing method of tapes for a double-deck VTR in accordance with the present invention.

FIG. 2 is a flow chart illustrating an embodiment of the continuous reproduction method of tapes for a double-deck VTR in accordance with the present invention.

With reference to the flow chart in FIG. 2 and block diagram of the double-deck VTR in FIG. 1, the continuous reproduction method of tapes for the double-deck VTR in accordance with the present invention will now be described in detail.

First of all, if the user wants the same program tele-recorded on many pieces of tapes marked with auto marking, end marking and start marking signals, the user loads the first and second tapes into first and second decks 410, 510 respectively.

Then, micro processor 200, by the operation of the user, performs the function of the key operated by the input of the key signals input from key matrix 100, S 200.

During performance of the function, when the reproduction key signal is input from first deck key matrix 110, S 202, micro processor 200 perceives first deck 410 as A deck and perceives second deck 510 as B deck, S 204, and when the reproduction key signal is input from second deck key matrix 110, S 206, micro processor 200 perceives second deck 510 as A deck and perceives first deck 410 as B deck, S 208.

Micro processor 200, when perception of decks S 204, S 208 is finished, controls the servo system of the deck perceived as A deck, and starts the reproduction of the tape loaded in A deck, S 210.

In other words, the deck loaded with the first tape tele-recorded with the first contents is perceived as A deck, and the deck loaded with the second tape tele-recorded with the second contents is perceived as B deck.

Accordingly, the user, when the tape tele-recorded with the first contents is loaded in first deck 410, presses the reproduction button on first deck key matrix 110.

When first deck key matrix 110 is pressed, micro processor 200 perceives first deck 410 as A deck, and simultaneously controls first deck servo system 400 and reproduces the first tape loaded in first deck 410 perceived as A deck.

When the tape loaded in the deck perceived as A deck is reproduced, micro processor 200 perceives S 212 auto marking signal and the end of the tape S 214 from the reproduction signal reproduced from the tape, and in the meantime, keeps reproducing the tape loaded in the deck perceived as A deck, S 210.

Micro processor 200, when the auto marking signal is not perceived during reproduction and the reproduction of the tape is finished, controls the servo system of the deck currently under reproduction, and then stops reproduction of the tape, S 216, thus finishing the operation.

However, when the auto marking signal is perceived during the reproduction process of the tape loaded in A deck, micro processor 200 keeps reproducing the tape S 218 loaded in A deck and at the same time, controls the servo system of the deck perceived as B deck, and then, rewinds or fast-rewinds the tape loaded in B deck, S 220.

Micro Processor 200 searches for the start marking signal S 222 by rewinding the tape loaded in B deck.

Micro Processor 200, when the start marking signal is perceived by searching for the start marking signal on the tape loaded in B deck, controls the servo system of B deck, causing it to wait in a soon-to-be-reproduced status S 224. Also, micro processor 200 discriminates whether or not the reproduction process of A deck is stopped, S 226.

Even during the waiting status of B deck, the reproduction process of the tape loaded in A deck continues, and micro processor 200 discriminates whether or not the end marking signal is perceived from A deck S 228.

While the process of whether or not the end marking signal is perceived from A deck has been performed and the tape loaded in A deck is reproducing, the end marking signal is perceived after the predetermined period of time elapses.

When the end marking signal is perceived from the tape loaded in A deck, micro processor 200 controls the servo system of A deck and stops the reproduction operation, S 230.

When the reproduction of the tape loaded in A deck is stopped, micro processor 200 perceives the stop of the reproduction operation of A deck, and then perceives B deck as A deck and perceives A deck as B deck S 232.

At this moment, if the program is composed of more than 3 tapes having the same contents, the user extracts the tape in A deck, which has finished reproduction, and loads the third tape into A deck.

Then, micro processor 200 perceives as A deck, B deck wherein the tape tele-recorded with the second program is loaded, and perceives as B deck, A deck wherein the tape tele-recorded with the third program is loaded.

Thereafter, micro processor 200 perceives as A deck the deck wherein the tape tele-recorded with the second contents is loaded and performs the reproduction process S 210.

Accordingly, the contents recorded on the first & second tapes are continuously reproduced without interruption, and by the same manner as mention above, micro processor 200 reproduces the tapes tele-recorded with the second program and perceives the auto marking signal.

When the auto marking signal is perceived from the tape tele-recorded with the second program, micro processor 200 searches the tape in B deck tele-recorded with the third program and seeks out the start marking signal.

When the search for the start marking signal is finished, micro processor 200 lets B deck wait in reproduction-waiting status, and when the end marking signal is perceived from the tape in A deck tele-recorded with the second program, micro processor 200 perceives as A deck B deck wherein the tape tele-recorded with the third program is loaded and reproduces the tape tele-recorded with the third program from the start marking signal.

As from the foregoing, when the end marking, auto marking and start marking signal are marked on a multitude of tapes tele-recorded with the same program, the user can view the same program continuously without any interruption.

As depicted above, according to the present invention, when the auto marking, end marking and start marking signals are recorded on tapes in two or more pieces tele-recorded with the same program by a double-deck VTR, the inter-connected parts of the contents on the several pieces of tapes tele-recorded with the same program are searched, auto-marked, end-marked and start-marked, thereby enabling the user to view the naturally-matched pictures of a program during reproduction of a multitude of tapes.

What is claimed is:

1. A continuous reproducing method of tapes for a double-deck VTR, comprising:
   a first process for performing a reproduction operation of a first tape in an A deck after perceiving as said A deck a first deck wherein a reproduction key signal is input and after perceiving a second deck as a B deck;
   a second process for maintaining a reproduction-waiting status by searching for a start marking signal recorded on a beginning part of a second tape in said B deck after an auto marking signal is perceived from said first tape in said A deck while said A deck is performing said reproduction operation, said auto marking signal having been automatically recorded on an ending part of said first tape a predetermined distance before an end marking signal, said start marking signal having been recorded on said beginning part of said second tape in response to a second user input; and
   a third process wherein, when said end marking signal having been recorded on said ending part of said first tape in response to a first user input is perceived from said first tape in said A deck, while said A deck is performing the reproduction operation, the reproduction of said A deck is stopped and simultaneously said B deck is perceived as said A deck and said A deck is perceived as said B deck for performance of the reproduction operation of said A deck, and wherein repeated performance of the reproduction operation for a multitude of tapes tele-recorded with an identical program is conducted.

2. A continuous reproducing method of tapes for a double-deck VTR as defined in claim 1, wherein said auto marking, end marking and start marking signals are distinguished from one another, and under a condition of video signals not being obstructed, are recorded in advance before reproduction as VTR-detectable signals.

3. A continuous reproducing method for said first and second tapes of said double-deck VTR as defined in claim 1 wherein said end marking signal and said start marking signal are respectively recorded at corresponding places on an ending part of said first tape and on a beginning part of said second tape, said second tape being latterly reproduced, said ending part of said first tape and said beginning part of said second tape coinciding contents-wise.

4. A continuous reproducing method for said first and second tapes of said double-deck VTR as defined in claim 1, wherein said auto marking signal is recorded after automatically rewinding said first tape for a predetermined period of time, said auto marking signal being recorded in the process of said end marking signal being recorded.

5. A continuous reproducing method for said first and second tapes of said double-deck VTR as defined in claim 4, wherein the predetermined period of time represents a tape play time that is longer than the time necessary for said B deck to rewind said second tape and perceive said start marking signal.

6. A method for controlling continuous reproduction of video tapes having common recorded data in a double-deck VTR, said method comprising the steps of:
   searching an end portion of a first tape and a beginning portion of a second tape for said common recorded data, said first tape being loaded into a first deck and said second tape being loaded into a second deck;
   placing an end marking signal on said end portion of said first tape in response to a first user input;
   rewinding said first tape for a predetermined period of time and having an auto marking signal automatically placed on a designated portion of said first tape in response to said placement of said end marking signal;

removing said first tape from said first deck and loading said second tape into said first deck; and placing a start marking signal on said beginning portion of said second tape in response to a second user input, said start marking signal indicating where said second tape will be played from.

7. The method as claimed in claim 6, wherein said predetermined period of time represents a tape play time longer than an amount of time required for said second tape to be rewound until said start marking signal is identified.

8. The method as claimed in claim 6, wherein said searching is performed automatically in response to selection of a search function.

9. The method as claimed in claim 6, wherein said searching is performed manually by said user.

10. A method of continuous reproduction of tapes for a double-deck VTR, said method comprising the steps of:

reproducing a first tape loaded in a first deck;

perceiving an auto marking signal on said first tape, said auto marking signal having been automatically recorded on an ending part of said first tape a predetermined distance before an ending marking signal;

rewinding a second tape loaded in a second deck once said auto marking signal is perceived, said second tape being rewound until a start marking signal having been recorded on a beginning part of said second tape in response to a second input by a user is perceived on said second tape by said second deck;

continuing reproduction of said first tape by said first deck until said end marking signal having been recorded on said ending part of said first tape in response to a first input by said user is perceived on said first tape by said first deck;

ceasing reproduction of said first tape by said first deck when said end marking signal is perceived;

reproducing said second tape loaded in said second deck when said end marking signal is perceived on said designated portion of said first tape by said double deck VTR so that said first and second tapes are reproduced without interruption.

11. An apparatus for continuous reproduction of tapes having an overlapping portion for a double-deck VTR, comprising:

means for searching an end portion of a first tape and a beginning portion of a second tape for said overlapping portion, said first tape being loaded into a first deck and said second tape being loaded into a second deck;

means for placing an end marking signal on said end portion of said first tape in response to a first user input;

means for rewinding said first tape for a predetermined period of time and having an auto marking signal automatically placed on said first tape in response to said placement of said end marking signal; and means for placing a start marking signal on said beginning portion of said second tape in response to a second user input.

12. The apparatus as claimed in claim 11, wherein said predetermined period of time represents a tape play time which is longer than an amount of time required for said second tape to be rewound until said start marking signal is identified.

13. A continuous reproducing method of tapes for a double-deck VTR, comprising:

a first process of upon input of a reproduction key signal, performing a reproduction operation of information stored on a first tape installed within an A deck after perceiving as said A deck a first deck and after perceiving a second deck as a B deck;

a second process for maintaining a reproduction-waiting status by searching for a start marking signal recorded on a second tape installed within said B deck after sensing an auto marking signal on the first tape within said A deck while said A deck is performing said reproduction operation under the control of a microprocessor, said auto marking signal having been automatically recorded on said first tape a predetermined distance before an end marking signal, said start marking signal having been recorded on said second tape in response to a second user input; and a third process of stopping said reproduction operation, when said end marking signal is perceived from the first tape in said A deck while A deck is performing said reproduction operation under the control of the microprocessor, and simultaneously perceiving said B deck as said A deck and perceiving said A deck as said B deck for performance of said reproduction operation of the information stored on the first tape installed within said A deck; and repeating performance of said reproduction operation for a multitude of tapes tele-recorded with the information comprising an identical program, said end marking signal having been recorded onto said first tape in response to a first user input.

14. A continuous reproducing method of claim 13, further comprised of recording said auto marking, end marking and start marking signals without obstructing the information with said auto-marking, end marking and start marking signals being distinguishable from one another, before reproduction as detectable signals by the microprocessor during said reproduction operation.

15. A continuous reproducing method of claim 13, further comprised of recording said end marking signal and said start marking signal at different corresponding places respectively on an ending part of the first tape and on a beginning part of said second tape to establish an end and a beginning of a reproduction signal generated during said reproduction operation, subsequently reproducing the information stored on the first and second tapes, said ending part of said first tape and said beginning part of said second tape storing coinciding image data.

16. A continuous reproducing method of claim 13, further comprised of recording said auto marking signal after recording the end marking signal on an ending part of the first tape and rewinding the first tape for a predetermined period.

17. A continuous reproducing method of claim 13, further comprised of recording said auto marking signal, said end marking signal, and said start marking signal without obstructing the information being reproduced, said recording occuring before reproduction and said reproduction being performed by the microprocessor during said reproduction operation of said auto marking signal, said end marking signal, and said start marking signal;

said auto-marking signal, said end marking signal and said start marking signal being distinguishable from one another;

recording said end marking signal and said start marking signal at different corresponding places respectively on an ending part of the first tape and on a beginning part of said second tape to establish an end and a beginning of a reproduction signal generated during said reproduction operation, subsequently reproducing the information stored on the first and second tapes, said ending part of said first tape and said beginning part of said second tape storing coinciding programs of the information; and recording said auto marking signal after recording the end marking signal on said ending part of the first tape and rewinding the first tape for a predetermined period.

* * * * *

UNITED STATES PATENT AND TRADEMARK OFFICE
CERTIFICATE OF CORRECTION

PATENT NO. : 5,379,163
DATED : Jan. 3, 1995
INVENTOR(S) : Hyong-Ju Lee

It is certified that error appears in the above-indentified patent and that said Letters Patent is hereby corrected as shown below:

IN THE CLAIM

Column 8

Claim 1,   Line 16,   before "ending", change "said" to --an--;

Column 9
Claim 10,  Line 27,   before "marking", change "ending" to --end--;

Signed and Sealed this

Tenth Day of June, 1997

Attest:

BRUCE LEHMAN

Attesting Officer   Commissioner of Patents and Trademarks